United States Patent
Dimitrov et al.

(10) Patent No.: US 10,747,730 B2
(45) Date of Patent: Aug. 18, 2020

(54) PROVIDING EXTENDED FILE STORAGE FOR APPLICATIONS

(71) Applicant: SAP SE, Walldorf (DE)

(72) Inventors: Vencislav Dimitrov, Pernik (BG); Maria Jurova, Sofia (BG); Rashid Rashidov, Popovo (BG)

(73) Assignee: SAP SE, Walldorf (DE)

( * ) Notice: Subject to any disclaimer, the term of this patent is extended or adjusted under 35 U.S.C. 154(b) by 745 days.

(21) Appl. No.: 14/511,185

(22) Filed: Oct. 10, 2014

(65) Prior Publication Data

US 2016/0103851 A1 Apr. 14, 2016

(51) Int. Cl.
| | |
|---|---|
| *G06F 16/182* | (2019.01) |
| *H04L 29/08* | (2006.01) |
| *G06F 8/60* | (2018.01) |
| *G06F 9/455* | (2018.01) |

(52) U.S. Cl.
CPC ........... *G06F 16/183* (2019.01); *G06F 8/60* (2013.01); *G06F 9/45558* (2013.01); *H04L 67/1097* (2013.01); *G06F 2009/45579* (2013.01)

(58) Field of Classification Search
CPC .. G06F 9/45533; G06F 9/45558; G06F 3/067; G06F 17/30197; G06F 16/183; G06F 8/60; G06F 2009/45579; H04L 67/1097
See application file for complete search history.

(56) References Cited

U.S. PATENT DOCUMENTS

| | | | | |
|---|---|---|---|---|
| 8,281,307 B2* | 10/2012 | Arnold | ...................... | G06F 8/36 709/227 |
| 9,304,867 B2* | 4/2016 | Sivasubramanian | ........................ | G06F 11/1456 |
| 9,804,993 B1* | 10/2017 | Brooker | ................ | G06F 15/167 |
| 2009/0089781 A1* | 4/2009 | Shingai | ................. | G06F 9/5088 718/1 |
| 2010/0058335 A1* | 3/2010 | Weber | ................. | G06F 9/45533 718/1 |

(Continued)

OTHER PUBLICATIONS

Amazon, Amazon Elastic Compute Cloud, User Guide (API Version Dec. 1, 2012), 2013 (Year: 2013).*

(Continued)

*Primary Examiner* — William Spieler
(74) *Attorney, Agent, or Firm* — Buckley, Maschoff & Talwalker LLC

(57) ABSTRACT

Various embodiments of systems and methods for providing extended file storage for cloud applications are described herein. The method involves receiving a deployment request from a cloud application for file storage service, at the time of deployment. The deployment request includes information identifying a local folder and a mode of storage. The metadata relating to the information in the deployment request is stored in a persistent storage. Further, in response to receiving a start request to run the cloud application an application virtual machine is allocated and a block level storage volume is identified and attached to the application virtual machine. Further, the identified block level storage volume is mapped to the local folder identified in the stored metadata and the application virtual machine running the cloud application is started. The block level storage volume mapped to the local folder is accessed by application processes for performing read/write operations.

16 Claims, 3 Drawing Sheets

(56) References Cited

U.S. PATENT DOCUMENTS

| | | | | |
|---|---|---|---|---|
| 2010/0211740 A1* | 8/2010 | Rajan | .................... | G06F 3/0605 |
| | | | | 711/114 |
| 2010/0275205 A1* | 10/2010 | Nakajima | ........... | G06F 9/45558 |
| | | | | 718/1 |
| 2010/0306445 A1* | 12/2010 | Dake | .................... | G06F 3/0604 |
| | | | | 711/6 |
| 2011/0251992 A1* | 10/2011 | Bethlehem | .......... | H04L 12/2863 |
| | | | | 707/610 |
| 2012/0005193 A1* | 1/2012 | Nemoto | ................ | G06F 9/5072 |
| | | | | 707/722 |
| 2012/0030672 A1* | 2/2012 | Zygmuntowicz | ......... | G06F 8/60 |
| | | | | 718/1 |
| 2012/0179874 A1* | 7/2012 | Chang | .................. | G06F 9/45558 |
| | | | | 711/128 |
| 2013/0047160 A1* | 2/2013 | Conover | ............. | G06F 9/45558 |
| | | | | 718/1 |

OTHER PUBLICATIONS

Amazon Web Services, Inc., Amazon Elastic Compute Cloud: User Guide, API Version Feb. 1, 2013 (Year: 2013).*

\* cited by examiner

PROVIDING EXTENDED FILE STORAGE FOR APPLICATIONS

FIELD

The subject matter described herein relates to approaches for providing extended file storage for cloud applications.

BACKGROUND

IT organizations are challenged to meet today's constantly changing business needs and evolving workloads. Current approaches to solving these challenges include leveraging virtualization and automation technologies as part of a company's data center. An emerging mechanism for meeting the next level of flexibility, agility and rapid response challenges is cloud computing, which allows customers to run applications in a third party's hosted environment and quickly add or remove instances of these applications as required.

Different cloud applications have different requirements to the file system of the virtual machines (VMs) that they run on. For example, some cloud applications may require bigger file system space than what is provided by the virtual machine template. The free file system that comes with the VM templates may not be sufficient if the application has more extensive file operations. Conventionally, this requirement is addressed, although partially, by providing large virtual machines. However, large virtual machines have large CPUs, which may not be utilized efficiently. Alternatively, this requirement may be addressed by providing bigger file system to each of the virtual machines, however, it may not be an optimal and cost effective solution for the cloud service provider. Further, some other cloud applications may require stored data to be available even after the application is restarted or require that the stored data be available to all virtual machines that the application runs on.

SUMMARY

Various embodiments of systems and methods for providing extended file storage for cloud applications are described herein. In an aspect, a deployment request from a cloud application for file storage service is received, at the time of deployment. The deployment request includes information identifying a local folder and a mode of storage. In another aspect, metadata relating to the information in the deployment request is stored in a persistent storage. Further, a start request is received to run the cloud application. In response to the start request, an application virtual machine is allocated. In yet another aspect, a block level storage volume is identified and attached to the application virtual machine. Further, the identified block level storage volume is mapped to the local folder identified in the stored metadata. In yet another aspect, the application virtual machine running the cloud application is started and the block level storage volume mapped to the local folder of the cloud application is accessed for perforating read/write operation.

These and other benefits and features of embodiments—will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
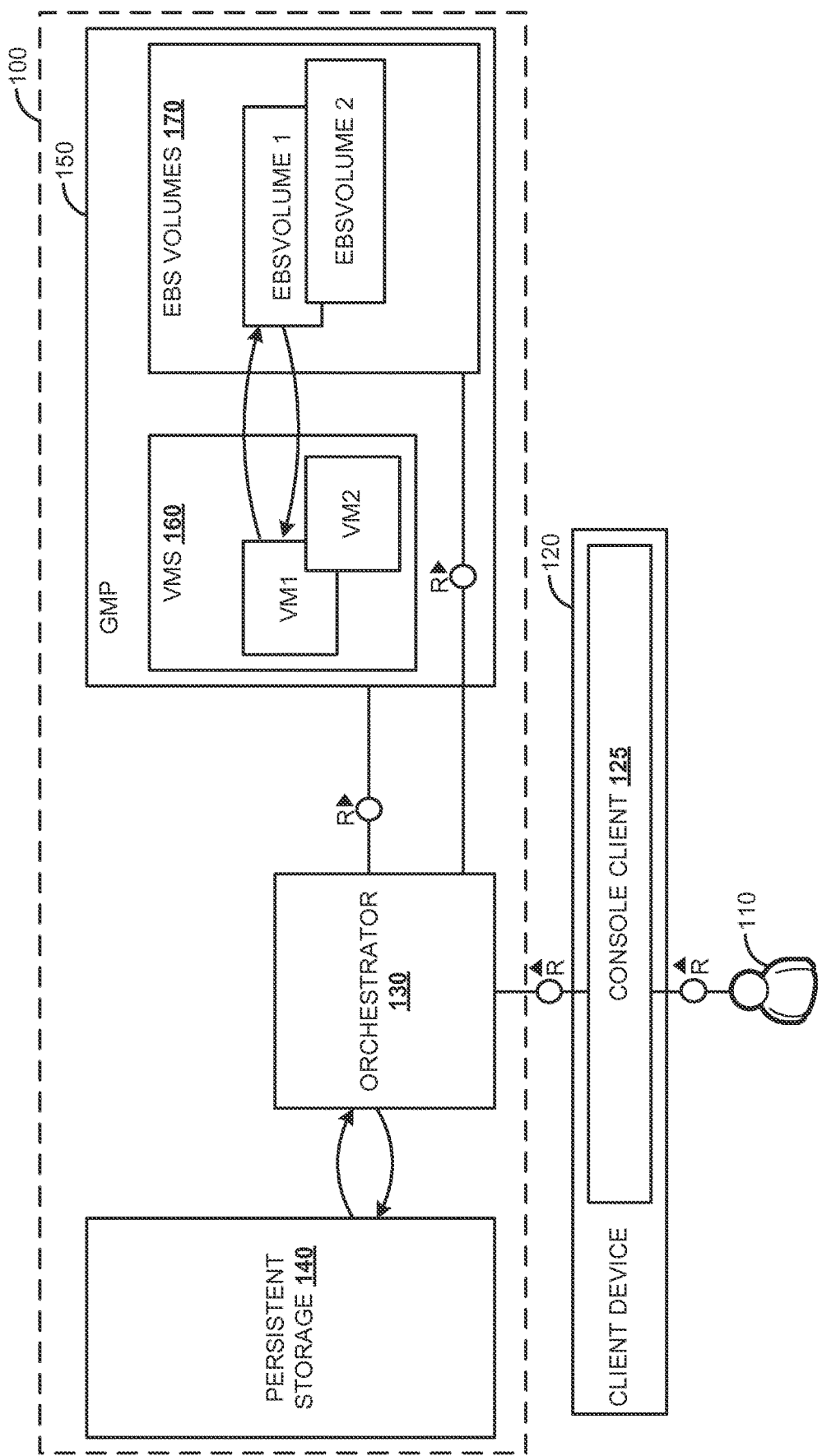
FIG. 1 is a block diagram illustrating elements of an exemplary system consistent with implementations of the current subject matter, according to one embodiment.

Embodiments of techniques for providing extended file storage for cloud applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Implementations of the current subject matter provide extended file storage for cloud applications running on a virtual machine. A virtual machine (VM) is a software abstraction, or "virtualization," of a physical computer system. A VM typically mimics the general structure of a physical computer. The virtual system hardware typically includes at least one virtual CPU, virtual memory, at least one storage device such as a virtual disk, and one or more virtual devices. All of the virtual hardware components of the VM can be implemented as software to emulate corresponding physical components. An advantage of virtual machine technology is the ability to ran multiple virtual machines on a single host platform. A VM template could be an exact, model copy of a virtual machine (VM) from which an administrator can clone, convert or deploy more virtual machines.

A VM template includes the virtual machine's virtual disks and settings from its configuration file, managed with permissions. Templates save time and avoid errors while configuring settings and other choices to create new Windows or Linux server VMs. They can also be used as long-term in-place backups of VMs, and to ensure that consistent VMs are created and deployed across a company.

However, typically, the free file system that comes with a VM template may not be sufficient if an application running on an instantiated VM has more extensive file operations. Such applications may require bigger file system space. Cloud infrastructure allows file storage volumes to be attached to the virtual machines that the applications run on. Consistent with implementations of the current subject matter, file storage space for cloud applications can be increased by providing additional functionality to the virtual machine provisioning process. The additional functionality involves attaching a block level storage volume to the virtual machine as described with reference to FIG. 1.

FIG. 1 shows an example of a computer system 100 on which the development environment described herein may be implemented. The computer system 100 embodies a cloud computing infrastructure having a server or servers connected through a communication network such as the Internet, intranet, local area network (LAN), or wide area network (WAN). The server may be accessed to run an application, store data, or perform other computing task using the server's processing power. Since the server is connected to a network via the internet or a similar connection platform, the server provides the processing power to run the application from computing devices (client device) that has the interface to connect to the cloud computing infrastructure. The phrase "in the cloud" is a shorthand way to refer to hosted services such as infrastructure, hardware, software, and/or platform that are provided "as a service", i.e., remotely through the internet. Typically, the servers host products and services from a remote location, hence, end-users may simply log on to the network without installing dedicated hardware and/or software. For example, end-users may access cloud-based applications through a web browser, thin client or mobile application while business software and user's data may be stored on servers at a remote location.

In an embodiment, system 100 includes a front-end component (client device 120), a back-end server 150 (Global Monitoring Platform (GMP)), orchestrator 130, and persistent storage 140. A network allows front-end and back-end components to communicate and exchange data. The client device 120 includes one or more processors and memory that stores instructions that are executable by the one or more processors. Client device 120 may be selected from various types of computing devices, such as a desktop computer, a mainframe computer, or the like, that has an interface capable of accessing the cloud infrastructure and transmitting command parameters to the back-end 150. Memory may also store an operating system (OS) and instructions for enabling communication between the client device 120 and the server 150.

The Global Monitoring Platform (GMP) 150 is an Infrastructure as a service (IaaS) layer composed of servers and/or virtual machines. In an embodiment, the GMP 150 provides one or more physical servers that may be configured and partitioned into multiple independent "virtual" machines (VMs) 160, and provides one or more block level storage volumes such as Elastic Block Store (EBS) volumes 170. In a block level storage, raw volumes of storage may be created and the blocks may be controlled as individual hard drives. In an aspect, these blocks are controlled by server based operating systems and each block can be individually formatted with the required file system. The term "file storage volume" as used herein refers to block level storage volume and may be used interchangeably hereinafter In an embodiment, during an application deployment phase, the system 100 receives a request to configure an application in the cloud from a user such as an account operator 110 at the client device 120. In an aspect, the account operator operates an account that rims one or more applications. Further the system 100 receives a request from the client device 120 to enable file storage service for the application in the cloud. The request includes a deployment descriptor specifying that the application would use file storage service and parameters such as the name of a local folder where the file system will be attached, mode of storage, e.g., persistent mode or local mode (local to a virtual machine VM1 or VM2, 160) etc. A console client 125 of the client device 120 such as the SAP HANA® Cloud platform console client passes the command parameters in the deployment descriptor to the orchestrator 130. The "orchestrator" as used herein refers to an entity that manages complex cross domain (system, enterprise, firewall) workflows, and exceptions. In an aspect, the orchestrator 130 performs deployment service involving handling requests from the client and performing deployment operation (e.g., processing deployment requests and storing binaries and artifacts to the persistent storage 140). Further, the orchestrator 130 performs cloud service orchestration involving communicating with the OMP 150, provisioning VMs 160, and connecting and automating work flows to deliver a requested service. Referring to FIG. 1, the orchestrator 130 executes the deployment and stores the parameters such as the file storage usage, local folder name, mode of storage, etc., as information metadata along with binaries in persistent storage 140 (e.g., domain DB/JPaaS repository).

During an application start phase, the system 100 receives a request from the client device 120 to start an application. In response to the request, the orchestrator 130 accesses the information metadata and binaries corresponding to the application at the persistent storage 140. The orchestrator 130 allocates a virtual machine (160) to the application. Further, the orchestrator 130 determines whether a file storage usage is specified in the deployment descriptor parameters in the information metadata. Upon determining that a file storage usage is specified, the orchestrator identifies a file storage volume (EBS volume 170), attaches the file storage volume 170 to the allocated virtual machine 160, and maps the file storage volume 170 to the local folder specified in the information metadata. In an aspect, upon determining that file storage usage is specified in the information metadata for the cloud application to be started, the orchestrator 130 determines whether a file storage volume previously used by the cloud application exists. If so, the orchestrator 130 attaches the previously used file storage volume 170 to the local folder of the application. Thus, previously written information may be preserved and accessible to the cloud application. If more than one instance of the application is started, for example, if the account operator configures ten processes then respectively ten VMs may be started and the appropriate file storage volumes may be attached to the VMs.

Upon initializing the application environment for file storage usage, the orchestrator 130 starts the application. During the cloud application start up, the orchestrator 130 finds the file storage volume 170 mapped to the local folder, and makes it available for read/write operation by application processes.

In an embodiment, when the application is stopped, the information metadata for the cloud application is fetched and checked whether the mode of storage specified for the cloud application is persistent or local. If it is determined that local mode of storage is specified in the information metadata, the content of the file storage volume in the local folder is cleared so that during application restart, the local folder is empty. Clearing unused data in the file storage volume enables optimization of resources and cost. In another aspect, while the application is miming, the application may trigger read or write operation to the file system at any point in time using e.g., a hypertext transfer protocol (HTTP) request. Whenever the application provides content to the folder where the file system is marked, the content is stored to the file storage volume that represents the file system.

Figure 2:
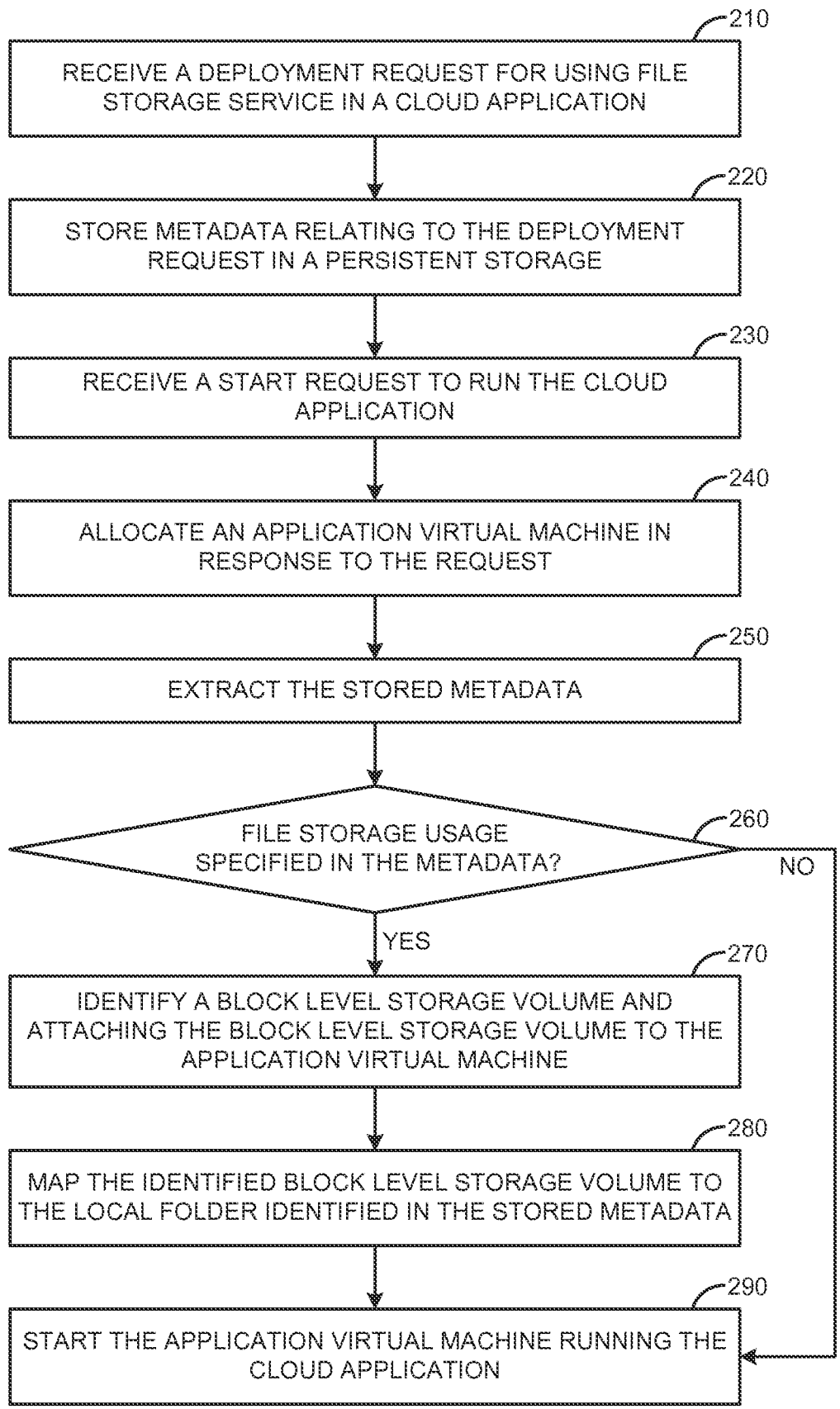
FIG. 2 is a flow diagram of a process for providing extended file storage for cloud applications, according to one embodiment.

FIG. 2 shows a flow diagram illustrating a process for providing extended file storage for cloud applications. The process involves receiving a deployment request for using file storage service in a cloud application, at the time of deployment, at 210. In an aspect, if an application needs to use file storage volume, an account operator of the account that runs the application creates a file storage request for the account. During deployment, the account operator at the client device specifies that the application requires file storage volume by passing related command parameters to the orchestrator in a deployment request. Further, the deployment request includes additional parameters such as a local folder and a mode of storage. The term "mode of storage" as used herein refers to local, shared, or persistent mode of storage of data in the file storage volume. The local folder represents the path where the file storage volume is to be available during application start up. In an aspect, the path is in the context of the runtime root folder. For example, if the root of Lean Java Server (LJS) runtime is '/usr/sap/ljs' and if the account operator defines the storage path as 'my_permanent_storage', then the file storage volume will be available at 'usr/sap/ljs/my_permanent_storage.' This path is a symbolic link to a directory in the file storage volume.

At 220, the deployment parameters in the deployment request such as the request for file storage usage, local folder name, mode of storage, etc., are stored as information metadata along with binaries corresponding to the application in persistent storage. In an aspect, a new section is added in the deployment descriptor that is stored in the persistent storage, e.g., JPaaS repository. The information relating to the usage of file storage volume by the application is stored in the newly added section in the deployment descriptor.

Further, the process involves receiving a start request to run the cloud application, at 230. In response to the request, an application virtual machine is allocated for the application. At 250, the information metadata in the persistent storage is extracted and, at 260, it is determined whether file storage volume is requested for the cloud application or not. If it is determined that file storage volume is requested for the cloud application, a file storage volume is identified and attached to the application virtual machine at 270. On the other hand, if it is determined that file storage volume is not requested for the cloud application, the process proceeds to 290. In an embodiment, file storage volumes are mounted as /mnt/perm_storage on all the virtual machines that belong to applications having file storage volume settings. Depending on the mode of storage setting, a directory structure may be created in the root of the files storage volume as shown in these examples:

Persistent mode: /mnt/perm_storage/persistent/<appliance>_<component>

Local mode: /mnt/perm_storage/local/<virtual_machine_name>

Shared mode: /mnt/perm_storage/shared< >

In an embodiment, the file storage volume is created and assigned to the account running the application such that all the applications in this account may use the file storage volume for all the modes of storage (persistent, local, shared). The assignment may be implemented by creating a new account attribute (e.g., perm.storage.id) and setting the file storage volume ID as its value. The process further involves, mapping the identified block level storage volume to the focal folder identified in the information metadata at 280. The application virtual machine running the cloud application is started, at 290, and the block level storage volume mapped to the local folder of the cloud application is accessed for performing read/write operation.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 3:
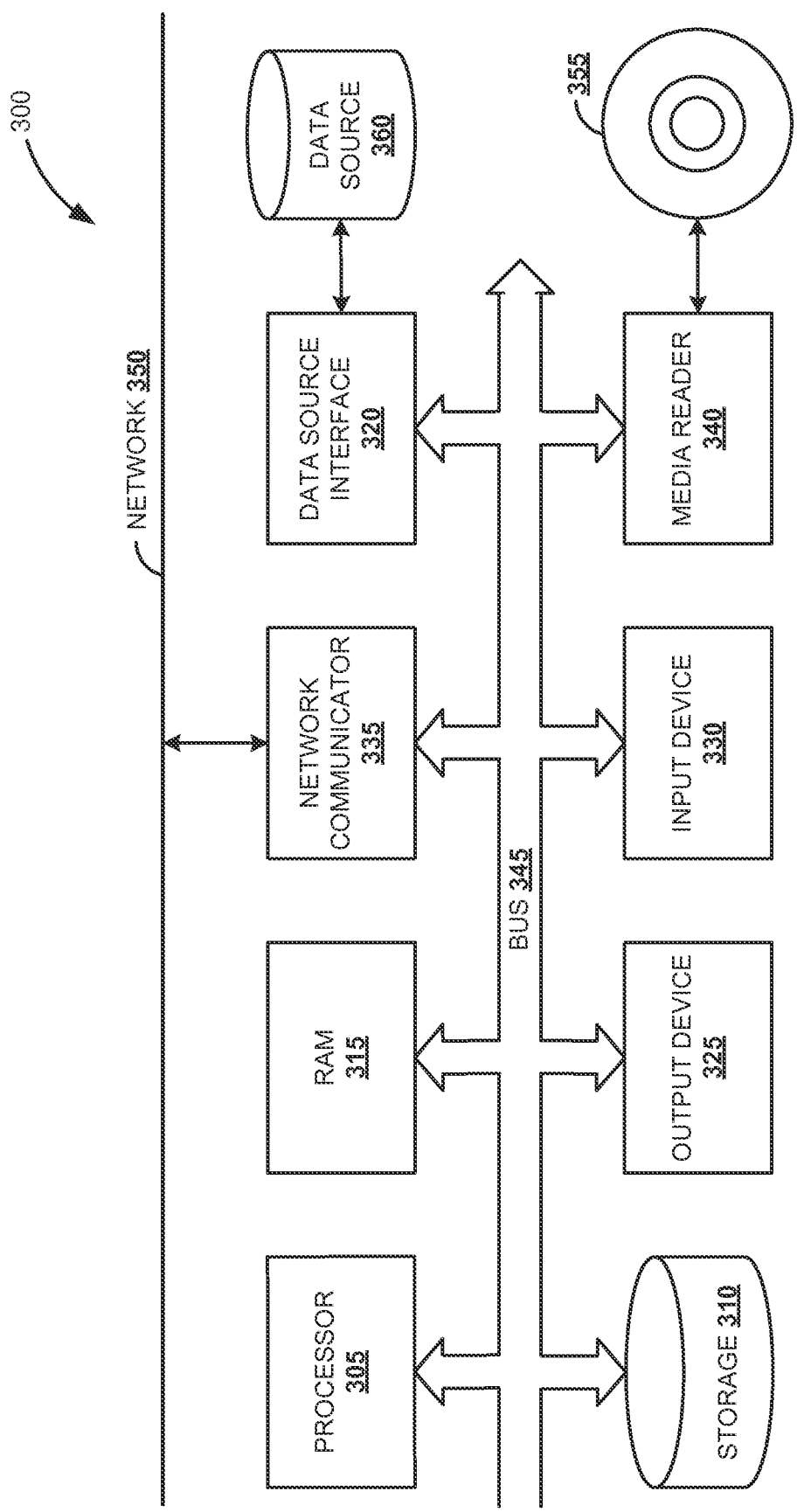
FIG. 3 is a block diagram of an exemplary computer system according to one embodiment.

FIG. 3 is a block diagram of an exemplary computer system 300. The computer system 300 includes a processor 305 that executes software instructions or code stored on a computer readable storage medium 355 to perform the above-illustrated methods. The processor 305 can include a plurality of cores. The computer system 300 includes a media reader 340 to read the instructions from the computer readable storage medium 355 and store the instructions in storage 310 or in random access memory (RAM) 315. The storage 310 provides a large space for keeping static data where at least some instructions could be stored for later execution. According to some embodiments, such as some in-memory computing system embodiments, the RAM 315 can have sufficient storage capacity to store much of the data required for processing in the RAM 315 instead of in the storage 310. In some embodiments, all of the data required for processing may be stored in the RAM 315. The stored instructions may be further compiled to generate other representations of the instructions and dynamically stored in the RAM 315. The processor 305 reads instructions from the RAM 315 and performs actions as instructed. According to one embodiment, the computer system 300 further includes an output device 325 (e.g., a display) to provide at least some of the results of the execution as output including, but not limited to, visual information to users and an input device 330 to provide a user or another device with means for entering data and/or otherwise interact with the computer system 300. Each of these output devices 325 and input devices 330 could be joined by one or more additional peripherals to further expand the capabilities of the computer system 300. A network communicator 335 may be provided to connect the computer system 300 to a network 350 and in turn to other devices connected to the network 350 including other clients, servers, data stores, and interfaces, for instance. The modules of the computer system 300 are interconnected via a bus 345. Computer system 300 includes a data source interface 320 to access data source 360. The data source 360 can be accessed via one or more abstraction layers implemented in hardware or software. For example, the data source 360 may be accessed by network 350. In some embodiments the data source 360 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A method comprising:
running multiple instances of a virtual machine on a cloud platform, where each instance of the virtual machine comprises a software representation of a physical server including a virtual processor and a virtual storage device;
receiving, from a client device, a request to start a cloud application on the cloud platform;
determining that file storage usage is requested for the cloud application based on deployment descriptor parameters of the cloud application stored within a persistent storage;
attaching a block level storage volume to an instance of a virtual machine selected from among the multiple instances of the virtual machine running on the cloud platform and mapping an identifier of the block level storage volume to a local folder of the cloud application specified in the deployment descriptor parameters thereby enabling access to the block level storage volume; and
starting the cloud application on the instance of the virtual machine, selected from among the multiple instances of the virtual machine running on the cloud platform, with the attached block level storage volume made available enabling the client device to run the cloud application through a web browser, wherein the started cloud application is hosted by the running instance of the virtual machine.

2. The method of claim 1, further comprising:
performing read/write operation on data stored in the attached block level storage volume of the cloud application on the instance of the virtual machine.

3. The method of claim 1, wherein the receiving comprises receiving an identification of the cloud application, and the determining comprises determining to extend the file storage based on metadata of the cloud application including the deployment descriptor parameters stored in one of a repository and a domain database (DB) of a cloud platform.

4. The method of claim 1, wherein the method further comprises clearing the attached block level storage volume from the local folder upon termination of the cloud application.

5. The method of claim 1, wherein the method further comprises:
determining whether a block level storage volume has been previously used by the cloud application; and
in response to determining that a previously used block level storage volume exists, attaching the previously used block level storage volume to the instance of the virtual machine prior to starting the cloud application.

6. The method of claim 1, wherein the mapping comprises identifying a name of the local folder of the cloud application where the mapping is to be performed from metadata stored in the persistent storage.

7. The method of claim 1, wherein the local folder of the cloud application represents a path where the block level storage volume is available during application startup of the cloud application on the instance of the virtual machine.

8. The method of claim 1, wherein a path of the local folder is based on a runtime root folder of the cloud application.

9. The method of claim 1, further comprising receiving the deployment descriptor parameters of the cloud application during an application deployment phase of the cloud application, and storing the received deployment descriptor parameters within the persistent storage.

10. A computer program product comprising a non-transitory machine-readable medium storing instructions that, when executed by at least one programmable processor, cause the at least one programmable processor to perform operations comprising:
running multiple instances of a virtual machine on a cloud platform, where each instance of the virtual machine comprises a software representation of a physical server including a virtual processor and a virtual storage device;
receiving, from a client device, a request to start a cloud application on the cloud platform;
determining that file storage usage is requested for the cloud application based on deployment descriptor parameters of the cloud application stored within a persistent storage;
attaching a block level storage volume to an instance of a virtual machine selected from among the multiple instances of the virtual machine running on the cloud platform and mapping an identifier of the block level storage volume to a local folder of the cloud application specified in the deployment descriptor parameters thereby enabling access to the block level storage volume; and
starting the cloud application on the instance of the virtual machine, selected from the multiple instances of the virtual machine running on the cloud platform, with the attached block level storage volume made available enabling the client device to run the cloud application through a web browser, wherein the started cloud application is hosted by the running instance of the virtual machine.

11. The computer program product of claim 10, wherein the operations further comprise:
performing read/write operation on data stored in the attached block level storage volume of the cloud application on the instance of the virtual machine.

12. The computer program product of claim 10, wherein the receiving comprises receiving an identification of the cloud application and the determining comprises determining to extend the file storage based on metadata of the cloud application including the deployment descriptor parameters stored in one of a repository and a domain database (DB) of the cloud platform.

13. The computer program product of claim 10, wherein the operations further comprise clearing the attached block level storage volume from the local folder upon termination of the cloud application.

14. The computer program product of claim 10, wherein the operations further comprise:
determining whether a block level storage volume has been previously used by the cloud application; and
in response to determining that a previously used block level storage volume exists, attaching the previously used block level storage volume to the instance of the virtual machine prior to starting the cloud application.

15. A system operating in a communication network, the system comprising:
a computer comprising a memory to store a program code, and a processor to execute the program code to:
run multiple instances of a virtual machine on a cloud platform, where each instance of the virtual machine comprises a software representation of a physical server including a virtual processor and a virtual storage device;
receive, from a client device, a request to start a cloud application on the cloud platform;
determine that file storage usage is requested for the cloud application based on deployment descriptor parameters of the cloud application stored within a persistent storage;
attach a block level storage volume to an instance of a virtual machine mapping selected from among the multiple instances of the virtual machine running on the cloud platform and map an identifier of the block level storage volume to a local folder of the cloud application specified in the deployment descriptor parameters thereby enabling access to the block level storage volume;
start the cloud application on the instance of the virtual machine, selected from the multiple instances of the virtual machine running on the cloud platform, with the attached block level storage volume made available enabling the client device to run the cloud application through a web browser, wherein the started cloud application is hosted by the running instance of the virtual machine.

16. The system of claim 15, wherein the processor is configured to receive an identification of the cloud application and determine to extend the file storage based on metadata of the cloud application including the deployment descriptor parameters stored in one of a repository and a domain database (DB) of a cloud platform.

* * * * *